United States Patent
Tu et al.

(10) Patent No.: US 7,261,973 B2
(45) Date of Patent: Aug. 28, 2007

(54) CONNECTING STRUCTURE FOR A FLIP COVER BATTERY COMPARTMENT OF A PORTABLE ELECTRONIC DEVICE

(75) Inventors: Ying Liang Tu, Shenzhen (CN); Chia-Hua Chen, Tu-Chen (TW)

(73) Assignees: Hong Fu Jin Precision Ind. (Shenzhen) Co., Ltd., Shenzhen (CN); Hon Hai Precision Ind. Co., Ltd., Tu-Cheng (TW)

( * ) Notice: Subject to any disclaimer, the term of this patent is extended or adjusted under 35 U.S.C. 154(b) by 647 days.

(21) Appl. No.: 10/843,278

(22) Filed: May 10, 2004

(65) Prior Publication Data

US 2004/0229114 A1    Nov. 18, 2004

(30) Foreign Application Priority Data

May 9, 2003    (TW) .............................. 92208547 U

(51) Int. Cl.
*H01M 2/10* (2006.01)
(52) U.S. Cl. .......................................... 429/100; 429/97
(58) Field of Classification Search ................. 429/97, 429/100
See application file for complete search history.

(56) References Cited

U.S. PATENT DOCUMENTS

| | | | | |
|---|---|---|---|---|
| 6,929,878 B2 * | 8/2005 | Chen et al. | ................. | 429/100 |
| 7,068,495 B2 * | 6/2006 | Luo et al. | .................... | 361/679 |
| 7,180,754 B2 * | 2/2007 | Qin et al. | .................... | 361/797 |
| 2004/0224220 A1 * | 11/2004 | Wang et al. | ................. | 429/96 |
| 2004/0224221 A1 * | 11/2004 | Chen et al. | .................... | 429/96 |

* cited by examiner

Primary Examiner—Jonathan Crepeau
Assistant Examiner—Robert Hodge
(74) Attorney, Agent, or Firm—Wei Te Chung

(57) ABSTRACT

A connecting structure for a flip cover battery compartment of a mobile phone comprises a base (1), a connecting member (2), a cover (3), a shaft (4), two springs (5), and two pins (6). The base comprises a receiving part (164) and a recessed portion (194). The recessed portion is for receiving a battery. Two hinges (22) is formed on one end of the connecting member. The cover comprises a pair of rails (322). The shaft extends through holes of the springs. The connecting member is connected to the springs by the pins. The connecting member can slide along the rails of the cover. Thus the combined cover and connecting member is rotatable relative to the base, and the cover is slidable relative to the connecting member so that the cover can be locked to the base in a closed position.

8 Claims, 5 Drawing Sheets

CONNECTING STRUCTURE FOR A FLIP COVER BATTERY COMPARTMENT OF A PORTABLE ELECTRONIC DEVICE

BACKGROUND OF THE INVENTION

1. Field of the Invention

This invention relates in general to portable electronic devices, and more specifically to a connecting structure for a battery compartment of a portable electronic device which includes a flip cover.

2. Prior Art

Portable electronic devices, such as mobile phones and personal digital assistants, are in widespread use around the world. These devices rely on batteries for power, the battery being removably received in a main body of the device.

For example, the Alcatel OT310 mobile phone comprises a main body, a receptacle in the main body for holding a battery, and a fully detachable battery cover. The battery cover has a pair of holders at an end thereof, and a pin at an opposite end thereof. A pair of slots is defined at an end of the receptacle, and a hole is defined at an opposite end of the receptacle. After a battery is loaded into the receptacle, the battery cover is attached over the receptacle. The holders are received in the slots and the pin is inserted into the hole. The battery cover is thus reliably engaged over the receptacle.

However, it is difficult and inconvenient for the user to detach the battery cover from the receptacle. Furthermore, when the user changes the battery of the mobile phone, the battery cover is completely separated from the main body. The battery cover is liable to be misplaced or accidentally damaged.

A need therefore exists for a new connecting structure for conveniently attaching a battery cover to a main body of a mobile phone.

SUMMARY OF THE INVENTION

Accordingly, an object of the present invention is to provide a connecting structure for a flip cover battery compartment of a portable electronic device, so that a user can conveniently change a battery of the portable electronic device without any risk of misplacing any loose part.

To achieve the above object, in one aspect of the present invention, a connecting structure for a flip cover battery compartment of a mobile phone comprises a base, a connecting member, a shaft, a cover, a pair of springs, and a pair of pins. The base comprises a receiving part and a recessed portion. The recessed portion is for receiving a battery. A pair of hinges is formed on one end of the connecting member. The cover comprises a pair of rails. The shaft extends through holes of the springs, and is received in the receiving part of the base. The connecting member is connected to the springs by the pins. The connecting member can slide along the rails of the cover. Thus the combined cover and connecting member is rotatable relative to the base, and the cover is slidable relative to the connecting member so that the cover can be locked to the base in a closed position.

Other objects, advantages and novel features of the present invention will be drawn from the following detailed description of a preferred embodiment of the present invention together with the attached drawings, in which:

DETAILED DESCRIPTION OF THE INVENTION

Figure 1:
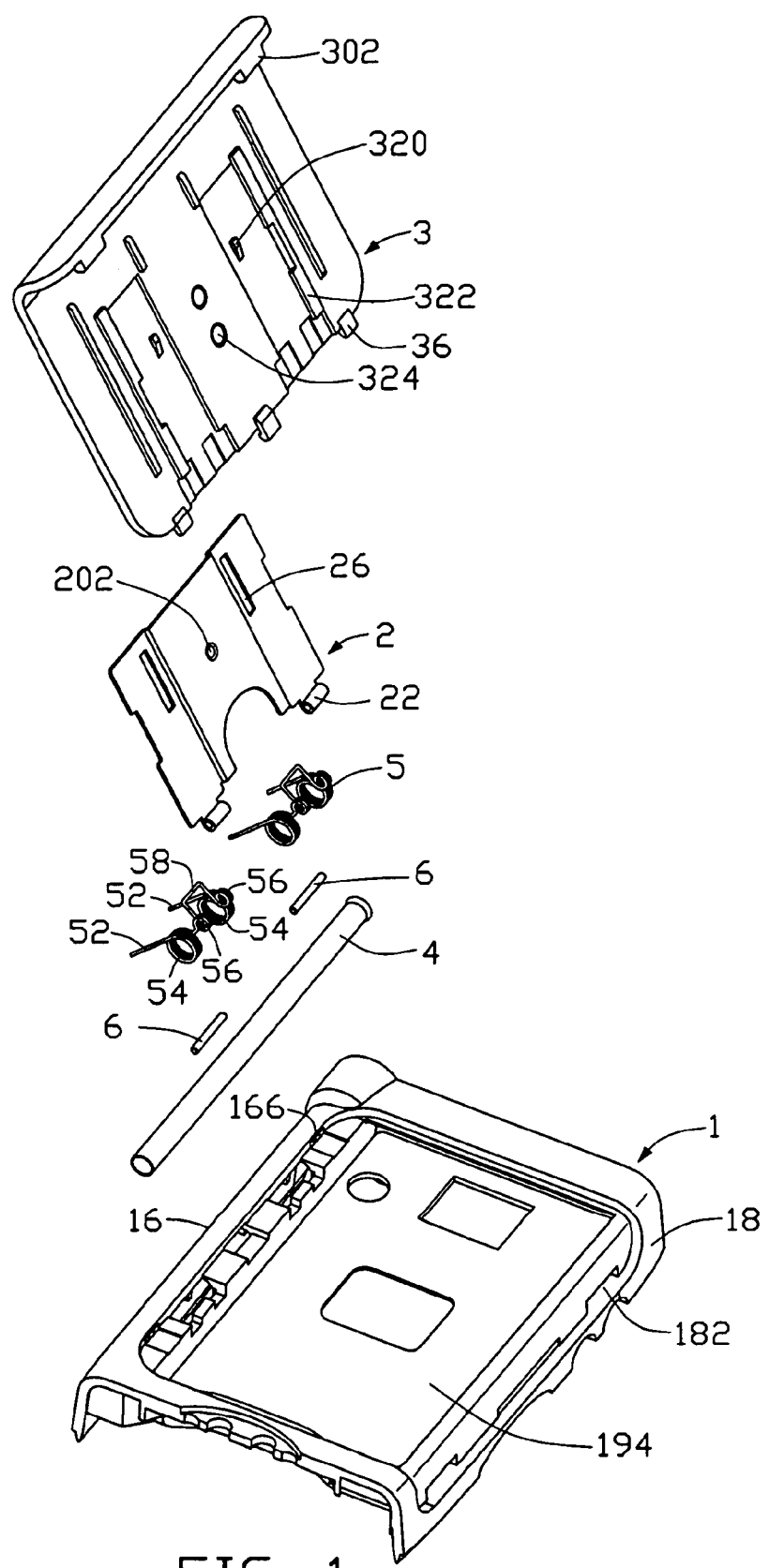
FIG. 1 is an exploded, isometric view of a connecting structure of a portable electronic device in accordance with the present invention.
Figure 2:
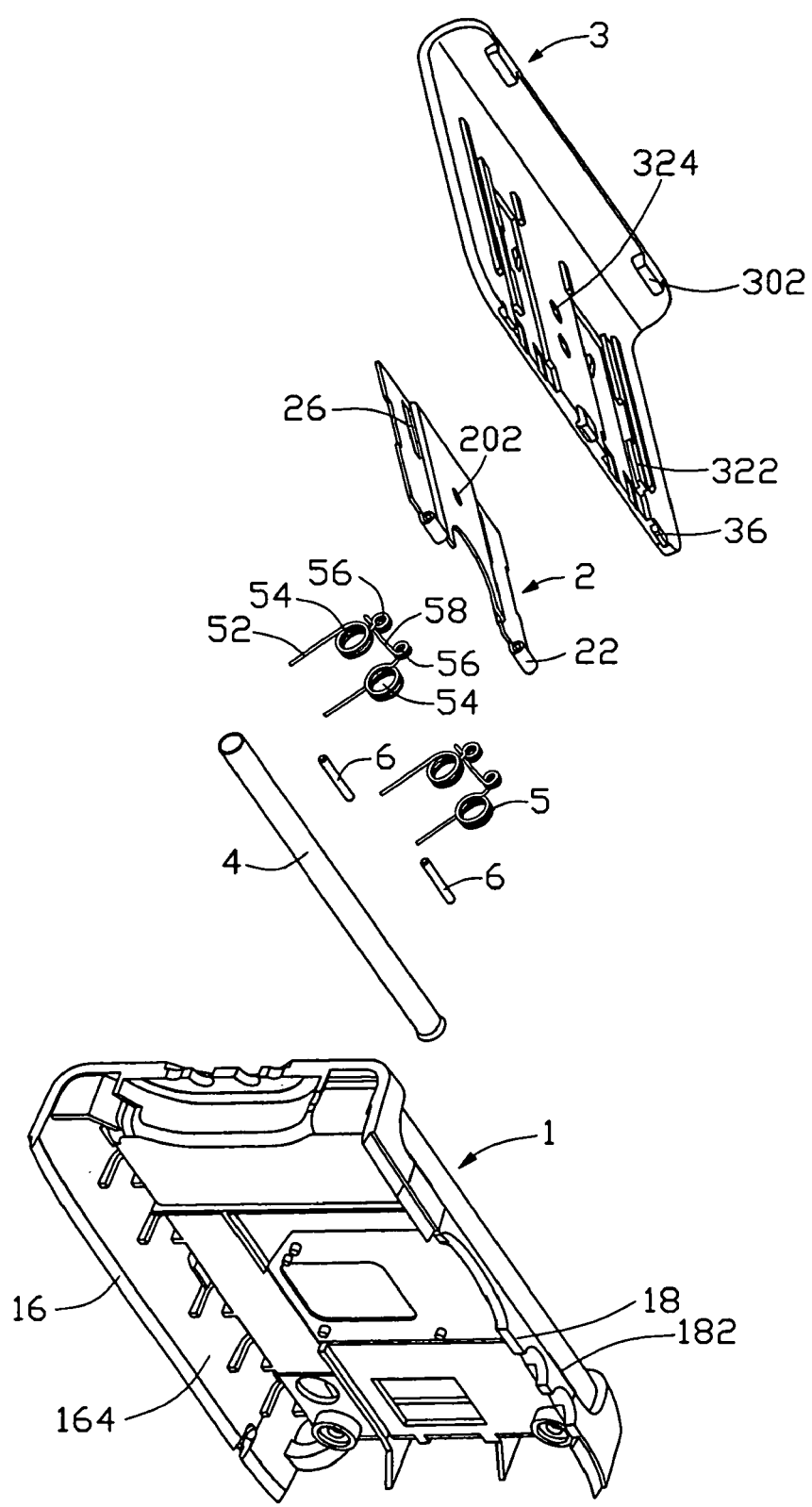
FIG. 2 is similar to FIG. 1, but viewed from another aspect.

Referring to FIG. 1 and FIG. 2, a connecting structure for a flip cover battery compartment of a portable electronic device comprises a base 1, a connecting member 2, a cover 3, a shaft 4, a pair of springs 5, and a pair of pins 6.

The base 1 comprises a recessed portion 194 for receiving a battery (not shown) of the portable electronic device, a left sidewall 16, and a right sidewall 18. The base 1 also comprises an elongate receiving part 164 at the left sidewall 16. A plurality of grooves 166 is defined in a top of the left sidewall 16. The shaft 4 is received in the receiving part 164. Two notches 182 are defined in the right sidewall 18.

The connecting member 2 defines two parallel slots 26. A pair of aligned, hollow hinges 22 is formed on one end of the connecting member 2. A locating projection 202 is formed on the connecting member 2 between the slots 26.

Figure 5:
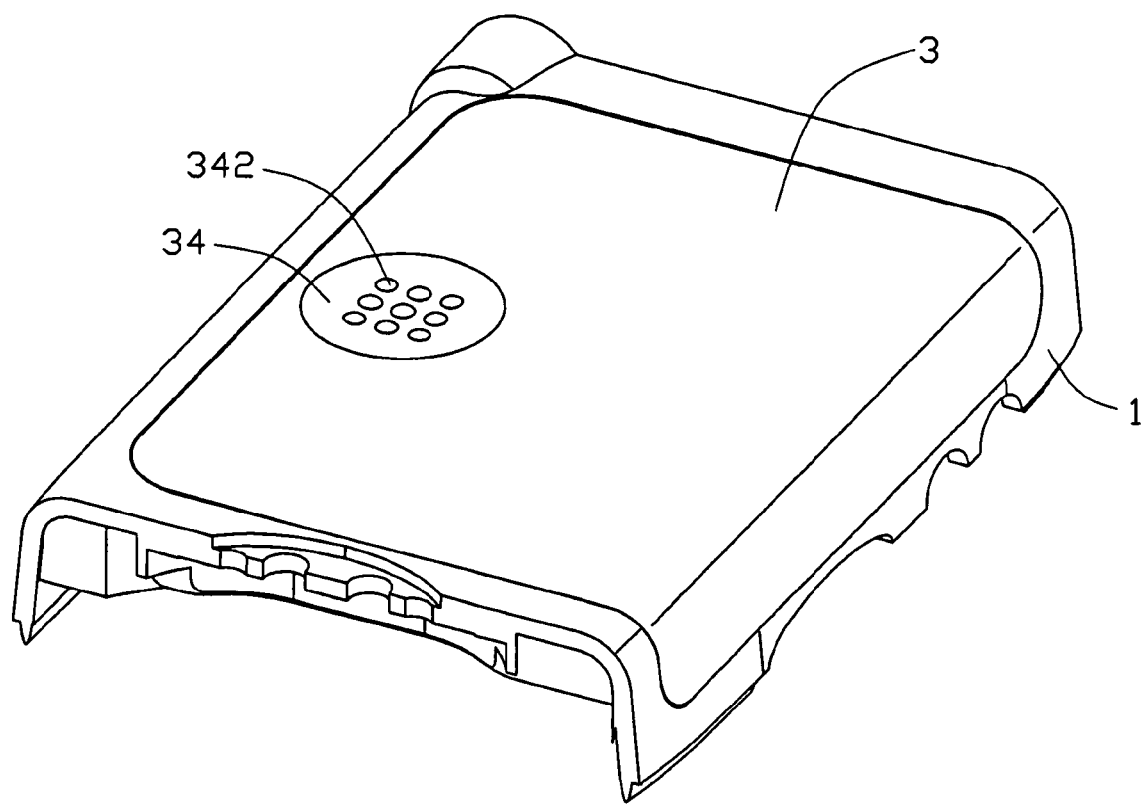
FIG. 5 is similar to FIG. 3, but showing the cover in a closed position.

Referring also to FIG. 5, the cover 3 comprises two spaced locking projections 302, a pair of guiding projections 320, two parallel rails 322, two recesses 324, a pressing portion 34, and a plurality of holders 36. The guiding projections 320 are slidably received in the slots 26 of the connecting member 2, so that the connecting member 2 can slide along the rails 322. The locking projections 302 are formed on one end of the cover 3. When the cover 3 is completely closed, the locking projections 302 of the cover 3 are held in the notches 182 of the base 1, and the holders 36 are received in the grooves 166 of the base 1. The pressing portion 34 is formed on an outer face of the cover 3, and has a plurality of gripping protrusions 342. The locating projection 202 of the connecting member 2 can be engagingly received in either of the recesses 324.

Each spring 5 comprises a pair of opposite ends 52, a pair of large holes 54, a pair of small holes 56, and an intermediate connecting arm 58. The shaft 4 is insertable through the large holes 54. A corresponding pin 6 is insertable through the small holes 56.

Figure 3:
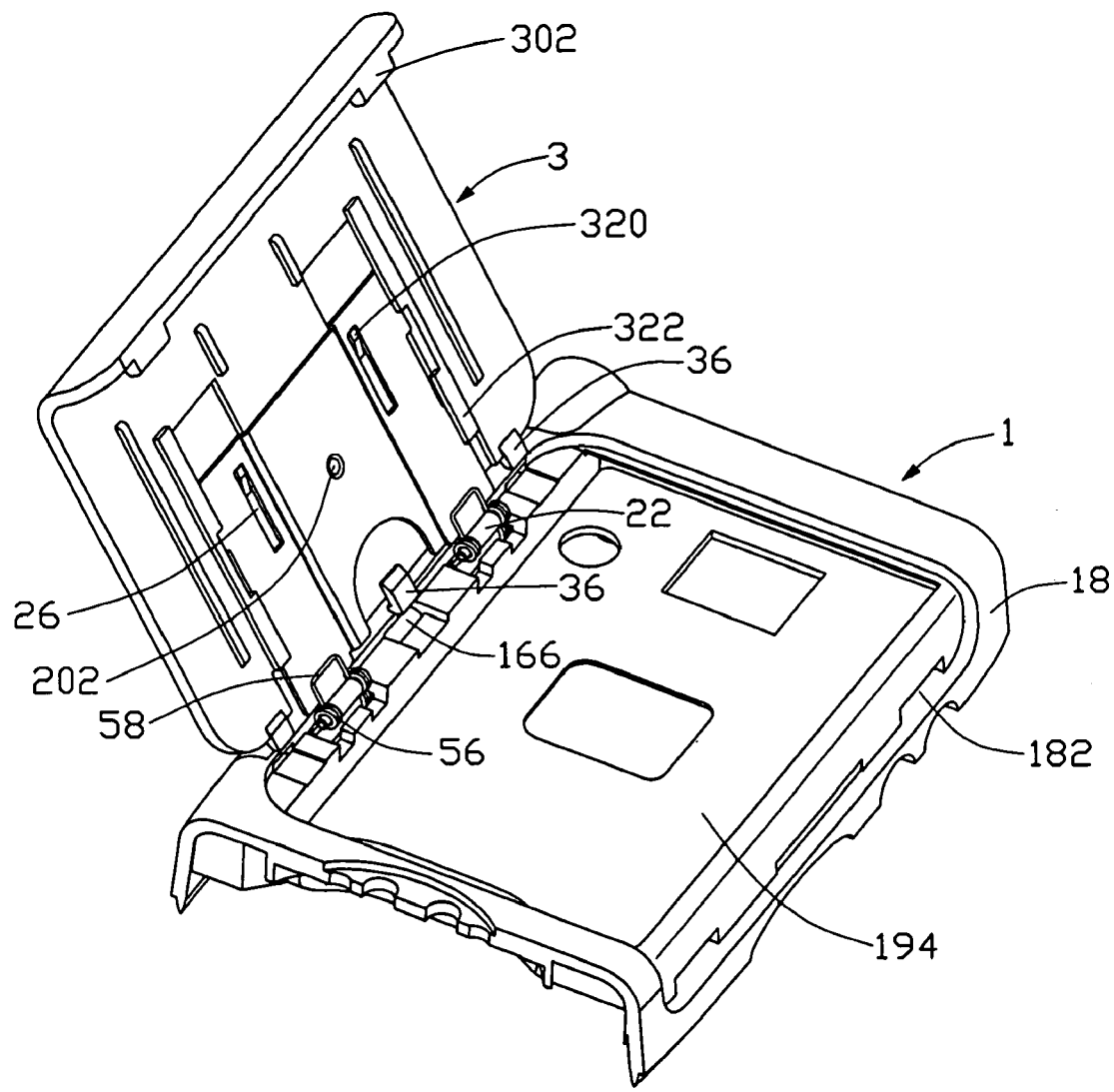
FIG. 3 is an enlarged, assembled view of FIG. 1, showing a cover of the connecting structure in an open position.
Figure 4:
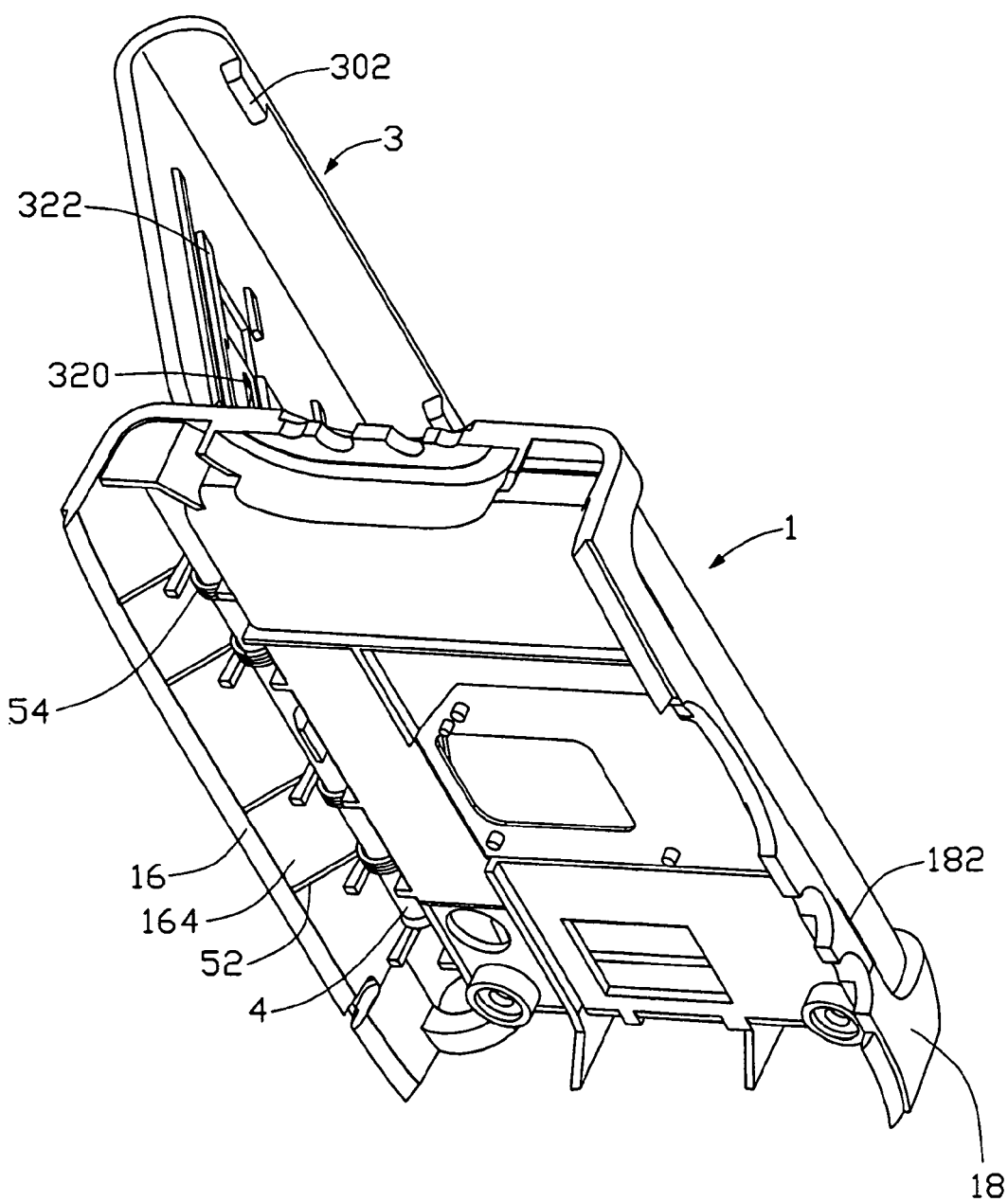
FIG. 4 is similar to FIG. 3, but viewed from another aspect.

Referring to FIGS. 3 and 4, in assembly, the connecting member 2 is held by the rails 322 of the cover 3, and the guiding projections 320 of the cover 3 are received in the slots 26 of the connecting member 2. Thus the connecting member 2 can slide along the rails 322 of the cover 3, with the guiding projections 320 sliding along the slots 26. The shaft 4 is inserted through the large holes 54 of the springs 5, and the combined shaft 4 and springs 5 is inserted into the receiving part 164 from an underside of the base 1 so that the connecting arms 58 protrude out above the left sidewall 16. The small holes 56 of the springs 5 are aligned with the hinges 62 of the connecting member 2, and the pins 6 are inserted through the corresponding small holes 56 and hinges 62 respectively. The springs 5 are thus connected to the connecting member 2. In this position, the springs 5 are slightly compressed, so that the connecting arms 58 are biased against a main face of the connecting member 2 above the hinges 22, and the ends 52 are biased against an inside of the left sidewall 16.

When the cover 3 is in an open position, the locating projection 202 is engaged in the recess 324 that is nearest the holders 36. A user can load the battery (not shown) into the recessed portion 194 of the base 1. Then the cover 3 and the connecting member 2 are rotated about the shaft 4 down to the base 1. In this process, the springs 5 are compressed further. When the cover 3 is parallel to the base 1 (see FIG. 5), the user pushes the pressing portion 34 toward the shaft 4. The locking projections 302 of the cover 3 are engaged in the notches 182 of the base 1, the holders 36 of the cover 3 are engaged in the grooves 166 of the left sidewall 16, and the locating projection 202 of the connecting member 2 is engaged in the recess 324 that is most distant from the holders 36.

When the user wants to change the battery, he/she pushes the pressing portion 34 of the cover 3 away from the shaft 4. The locking projections 302 are disengaged from the notches 182, the holders 36 are disengaged from the grooves 166, and the locating projection 202 engages in the recess 324 that is nearest the holders 36. The cover 3 then automatically rotates to the open position under force of decompression of the springs 5.

It is to be noted that the detailed description provided above should be viewed as being exemplary of the invention, and not as being restrictive of the invention as claimed herebelow.

What is claimed is:

1. A connecting structure for a flip cover battery compartment of a portable electronic device, comprising:
   a base, comprising a receiving part, and comprising a recessed portion for receiving a battery;
   a connecting member comprising a hinge at a first end thereof;
   a cover comprising a rail;
   a shaft received in the receiving part;
   a spring defining a hole; and
   a pin;
   wherein the shaft extends through a hole of the spring is received in the receiving part of the base, the connecting member is connected to the spring by the pin, and the connecting member can slide along the rail of the cover, whereby the cover and connecting member are rotatable in unison relative to the base, and the cover is slidable relative to the connecting member so that the cover can be locked to the base in a closed position.

2. The connecting structure of claim 1, wherein a sidewall of the base defines a plurality of grooves, and the cover further comprises a plurality of holders engagingly received in the grooves in the closed position.

3. The connecting structure of claim 1, wherein a locking projection is formed on the cover.

4. The connecting structure of claim 3, wherein a sidewall of the base defines a notch.

5. The connecting structure of claim 4, wherein the locking projection of the cover is engaged in the notch of the base when the cover is in the closed position.

6. The connecting structure of claim 1, wherein a guiding projection is formed on a first surface of the cover, the connecting member defines a slot, and the guiding projection is slidably received in the slot.

7. The connecting structure of claim 6, wherein a pressing portion is formed on a second surface of the cover, and the pressing portion has a plurality of gripping protrusions.

8. The connecting structure of claim 1, wherein the connecting member has a locating projection, the cover defines a recess, and the locating projection is received in the recess when the cover is in the closed position.

* * * * *